United States Patent
Beraldo dos Santos et al.

(10) Patent No.: US 9,946,630 B2
(45) Date of Patent: Apr. 17, 2018

(54) EFFICIENTLY DEBUGGING SOFTWARE CODE

(71) Applicant: International Business Machines Corporation, Armonk, NY (US)

(72) Inventors: Yves A. Beraldo dos Santos, Houston, TX (US); Matthew H. Caughman, Houston, TX (US); Charles J. Kastelic, Houston, TX (US); Meagan M. Miller, Richmond, TX (US); Jesse K. Tannahill, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/185,590

(22) Filed: Jun. 17, 2016

(65) Prior Publication Data
US 2017/0364431 A1    Dec. 21, 2017

(51) Int. Cl.
*G06F 11/36* (2006.01)

(52) U.S. Cl.
CPC ............... *G06F 11/366* (2013.01)

(58) Field of Classification Search
CPC ..................................... G06F 11/366
USPC ..................................... 717/124
See application file for complete search history.

(56) References Cited

U.S. PATENT DOCUMENTS

| | | | |
|---|---|---|---|
| 8,972,945 B2 | 3/2015 | Bates | |
| 9,146,834 B2 | 9/2015 | Smiljanic | |
| 9,201,759 B2 | 12/2015 | Wintergerst et al. | |
| 2004/0189717 A1* | 9/2004 | Conally | G06F 3/0481 715/853 |
| 2008/0126878 A1* | 5/2008 | Best | G06F 11/3636 714/45 |
| 2008/0155505 A1* | 6/2008 | Lin | G06F 11/362 717/124 |
| 2009/0038001 A1* | 2/2009 | Bozak | H04L 43/106 726/14 |
| 2009/0172636 A1 | 7/2009 | Griffith et al. | |
| 2009/0249250 A1* | 10/2009 | Gajula | G06F 11/3476 715/810 |

(Continued)

FOREIGN PATENT DOCUMENTS

CN      104683378 A     6/2015

OTHER PUBLICATIONS

"A Cloud Based Session Method for Efficient Method for Efficient Technical Support", Disclosed Anonymously, www.ip.com, IPCOM000233276, Dec. 5, 2013, 13 pages.

(Continued)

*Primary Examiner* — Ryan D. Coyer
(74) *Attorney, Agent, or Firm* — Francis Lammes; Stephen J. Walder, Jr.; Randall J. Bluestone (57) ABSTRACT

A mechanism is provided for efficiently debugging software code. A set of modified log files associated with the software code is presented to a software debugging user. Responsive to receiving an indication from the software debugging user to tag a portion of a modified log file of the set of modified log files with a tag, the portion of the modified log file is tagged such that the tag of the portion of the modified log file is utilized in debugging the software code. The tag of the portion of the modified log file is propagated to a plurality of other software debugging users who are viewing the modified log file.

20 Claims, 6 Drawing Sheets

(56) References Cited

U.S. PATENT DOCUMENTS

| | | | | |
|---|---|---|---|---|
| 2010/0004766 A1* | 1/2010 | Feng | ........................ | G10H 1/46 |
| | | | | 700/94 |
| 2010/0211932 A1* | 8/2010 | Jones | .................. | G06F 11/3624 |
| | | | | 717/124 |
| 2011/0154117 A1* | 6/2011 | Danielson | ........... | G06F 11/0748 |
| | | | | 714/37 |
| 2012/0102463 A1* | 4/2012 | Bates | .................... | G06F 11/362 |
| | | | | 717/125 |
| 2014/0282418 A1* | 9/2014 | Wood | .................. | G06F 11/3636 |
| | | | | 717/125 |
| 2014/0331089 A1 | 11/2014 | Mohindra et al. | | |
| 2015/0193328 A1 | 7/2015 | Deakin et al. | | |

OTHER PUBLICATIONS

Mikkonen, Tommi et al., "Elements for a Cloud-Based Development Enviornment: Online Collaboration, Revision Control, and Continuous Integration", WICSA/ECSA, Helsinki, Finland, Aug. 20-24, 2012, pp. 14-20.

* cited by examiner

EFFICIENTLY DEBUGGING SOFTWARE CODE

BACKGROUND

The present application relates generally to an improved data processing apparatus and method and more specifically to mechanisms for efficiently debugging software code.

"Infrastructure as a service" (IaaS) cloud computing paradigm has changed the way information technology (IT) services are managed and delivered to the end consumer. In such a cloud environment, the cloud-service provider exposes application programming interfaces (APIs) and an end user makes use of these APIs to request for virtual server resources. The virtual servers are always provisioned with a specific operating system and in many situations even with a complete application stack over the operating system. Access to the virtual machine is usually enabled via secure shell (SSH) or X-Windows™ like interface, not a console. Existing remote management consoles are not designed to operate in a cloud kind of environment.

It has been often observed in the cloud environments that virtual servers become inaccessible because of various system level problems, namely kernel incompatibility, wrong boot-sequence such as incorrect startup sequence of system services, bad system or application configuration, etc. This renders the end user completely helpless as the user can neither determine the problem nor fix it. This makes cloud-environments unsuitable for system development and testing purposes. In addition, it also makes the cloud service expensive and inefficient.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for efficiently debugging software code. The illustrative embodiments present a set of modified log files associated with the software code to a software debugging user. The illustrative embodiments tag the portion of the modified log file in response to receiving an indication from the software debugging user to tag a portion of a modified log file of the set of modified log files with a tag. In the illustrative embodiments, the tag of the portion of the modified log file is utilized in debugging the software code. The illustrative embodiments propagate the tag of the portion of the modified log file to a plurality of other software debugging users who are viewing the modified log file.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for efficiently debugging software code. As noted above, it has been often observed in the cloud environments that virtual servers become inaccessible because of various system level problems, namely kernel incompatibility, wrong boot-sequence such as incorrect startup sequence of system services, bad system or application configuration, etc. Thus, before a software product is deployed in a cloud environment, the software product is tested or used in the field, i.e. any geographical location other than the factory or office where the software product was created. During this testing, test engineers and/or support engineers identify issues with the software product and collect and package multiple log files from the software product. The multiple log files are sent to the creating software engineers to find exactly where in the log files the problem lies and fix the corresponding software code. In the log files, there may be thousands of lines of text that the software engineers must scan through.

With redundant and complex systems, such as FlashSystem™ products, log files from one part of a software product need to be compared with logs from another part of the software product. This means the software engineers would have to go line-by-line and scroll through output separated into multiple files. All debugging in the past has been performed from the command-line directly. Sometimes this would entail copying and pasting different sections of the output and manually sorting the output in order to compare. This is neither an efficient nor simple process.

Thus, the illustrative embodiments provide a software debugging mechanism that efficiently debugs software code. Because of the trouble with debugging software code as described above, the software debugging mechanism increases the speed and ease of debugging software code utilizing log files generated during testing. For a particular identified issue within the software code being debugged, the software debugging mechanism analyzes log files generated during testing associated with the identified issue and compares the log files side-by-side. That is, as test engineers, support engineers, development personnel, or the like, for the software code encounter issues, the log files logged during the encounter are tagged with messages identifying the issue, the log files are uploaded to the software debugging mechanism, and the software debugging mechanism compares the log files based on the messages. The software debugging mechanism parses the associated log files for the messages, organizing lines of text of the log files by timestamp, and coordinating events based on messages and timestamps. Since one software code system may comprise multiple log-producing components, which have processes running simultaneously, the software debugging mechanism provides for log file comparison from each piece of the system in individual columns, side-by-side based on messages and timestamps.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Thus, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and Personal Digital Assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
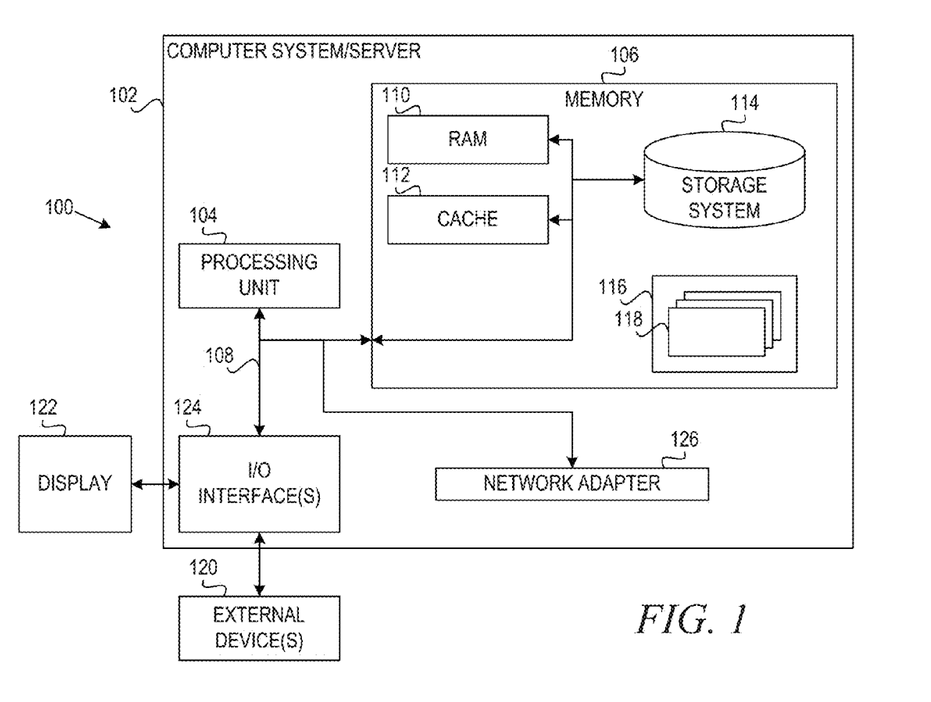
FIG. 1 depicts a cloud computing node according to an illustrative embodiment.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116, having a set (at least one) of program modules 118, may be stored in memory 106 by way of example, and not limitation, as well as an operating system, one or more application programs, other program modules, and program data. Each of the operating systems, one or more application programs, other program modules, and program data or some combination thereof, may include an implementation of a networking environment. Program modules 118 generally early out the functions and/or methodologies of embodiments of the invention as described herein.

Computer system/server 102 may also communicate with one or more external devices 120 such as a keyboard, a pointing device, a display 122, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 124. Still yet, computer system/server 102 can communicate with one or more networks such as a local area network (LAN), a general wide area network (WAN), and/or a public network (e.g., the Internet) via network adapter 126. As depicted, network adapter 126 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2:
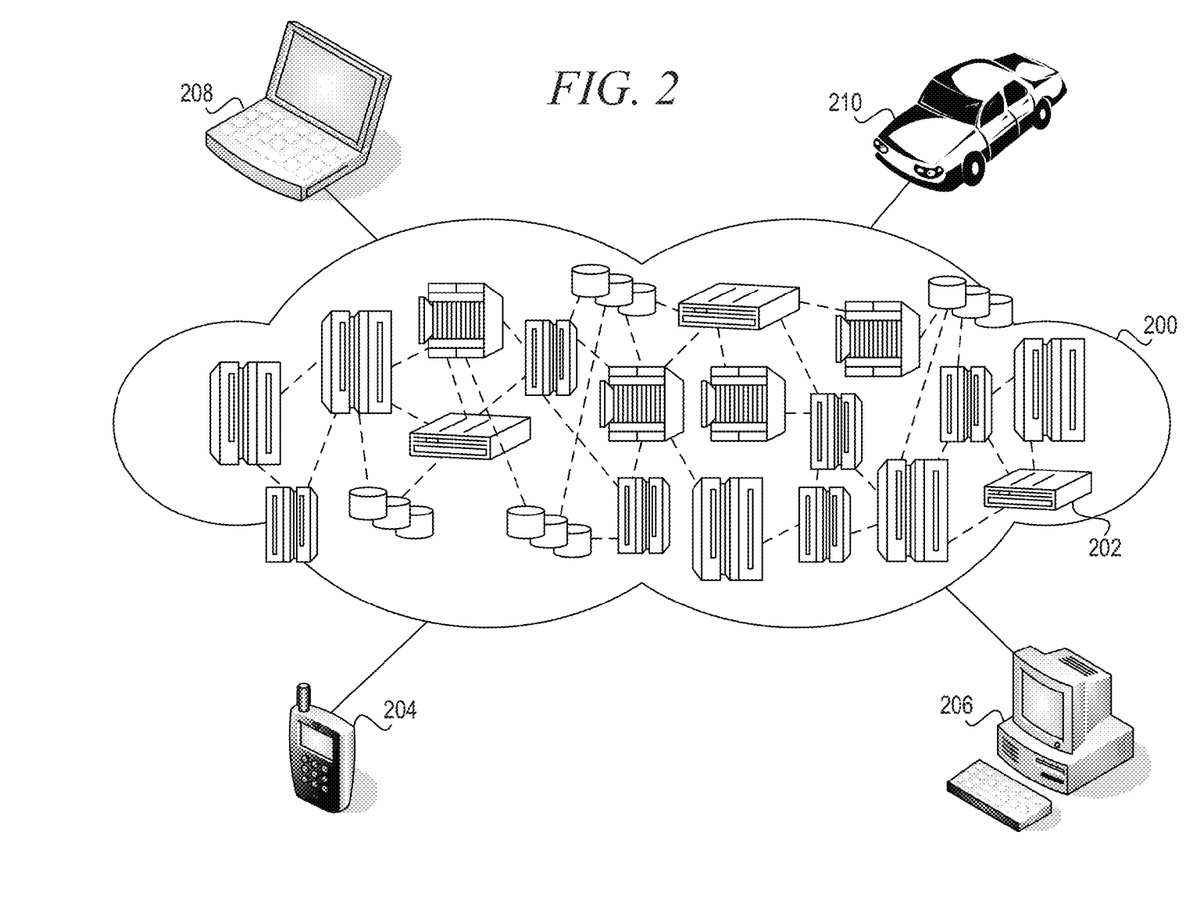
FIG. 2 depicts a cloud computing environment according to an illustrative embodiment.

Referring now to FIG. 2, illustrative cloud computing environment 200 is depicted. As shown, cloud computing environment 200 comprises one or more cloud computing nodes 202, such as computing node 100 of FIG. 1, with which local computing devices used by cloud consumers, such as, for example, personal digital assistant (PDA) or cellular telephone 204, desktop computer 206, laptop computer 208, and/or automobile computer system 210 may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204-210 shown in FIG. 2 are intended to be illustrative only and that computing nodes 202 and cloud computing environment 200 can communicate with any type of computerized device over any type of network and/or network addressable connection e.g., using a web browser).

Figure 3:
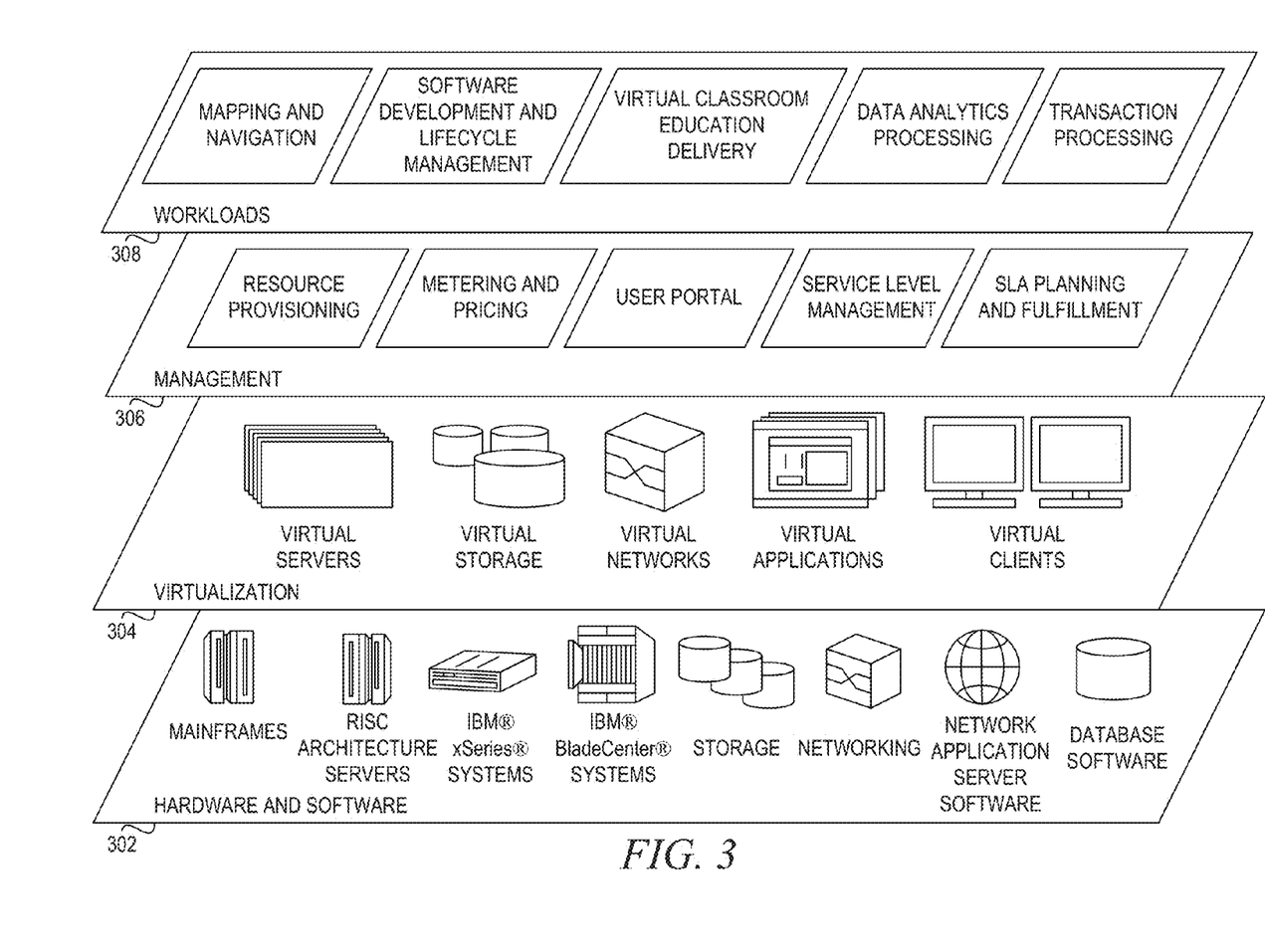
FIG. 3 depicts abstraction model layers according to an illustrative embodiment.

Referring now to FIG. 3, a set of functional abstraction layers provided by cloud computing environment 200 of FIG. 2 are shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes, in one example IBM® zSeries® systems; RISC (Reduced Instruction Set Computer) architecture based servers, in one example IBM pSeries® systems; IBM xSeriesCR) systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
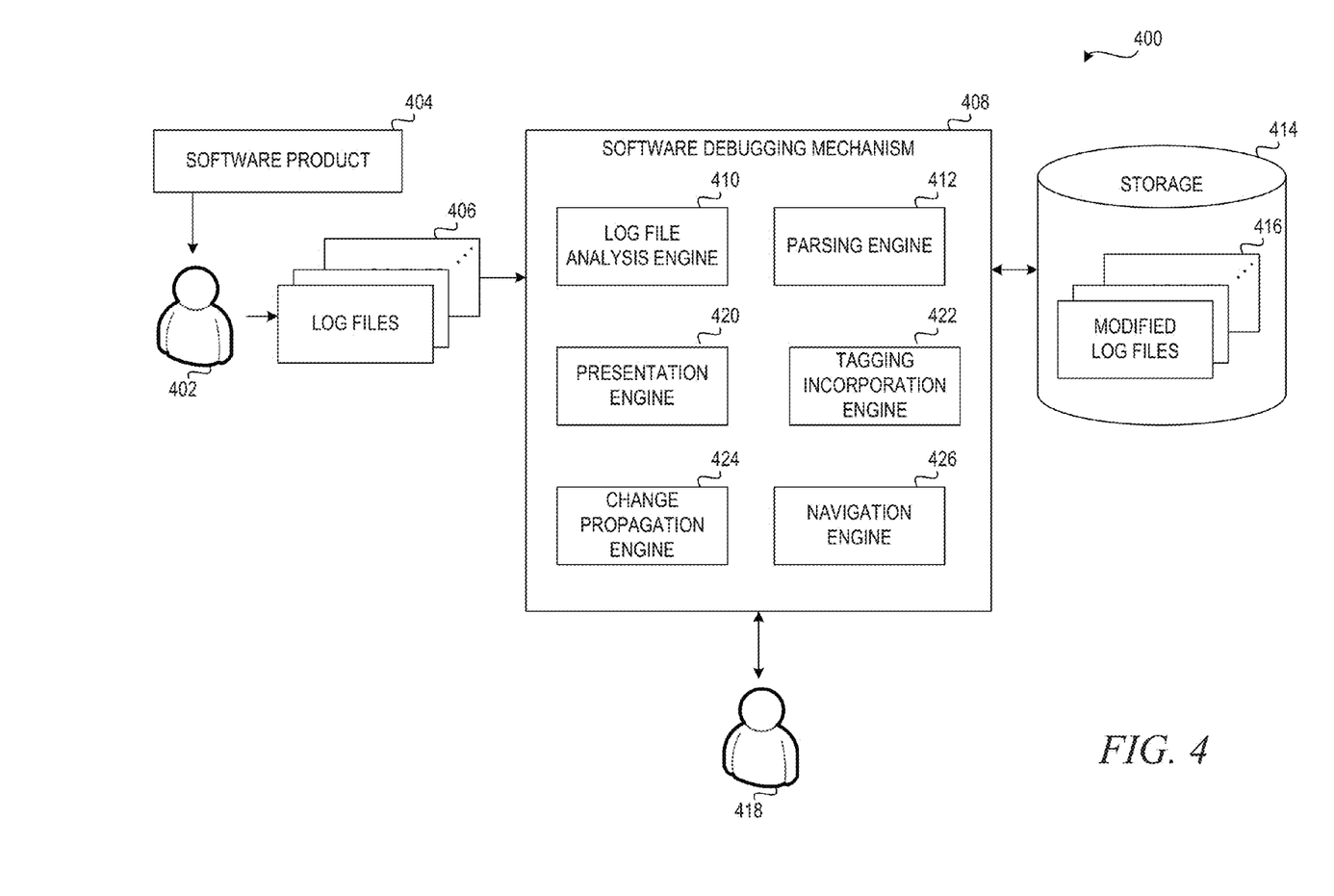
FIG. 4 depicts an exemplary software debugging mechanism within a cloud computing environment that provides efficient debugging of software code in accordance with an illustrative embodiment.

In accordance with the illustrative embodiments, the software debugging mechanism that efficiently debugs software code is a Web-based application or a Web-based server which operates within a cloud-computing environment such as cloud computing environment 200 of FIG. 2. FIG. 4 depicts an exemplary software debugging mechanism 400 within a cloud computing environment that provides efficient debugging of software code in accordance with an illustrative embodiment. In accordance with the illustrative embodiments, a plurality of users 402, such as field engineers, test engineers, support engineers, or the like, are provided with software product 404 to be tested. Testing of the software product 404 by each field engineer, test engineer, support engineer, or the like, generates a log file 406 that is uploaded to software debugging mechanism 408.

Upon receiving log file 406, log file analysis engine 410 within software debugging mechanism 408 processes log file 406 and checks whether log file 406 is corrupt. If tog file analysis engine 410 determines that log file 406 is corrupted, tog file analysis engine 410 rejects log file 406 from being further processed by software debugging mechanism 408 and notifies the user 402 to obtain a valid log file by rerunning software product 404 and collecting a new log file 406. If log file analysis engine 410 determines that log file 406 fails to have any corruption, parsing engine 412 performs numerous automated functions. The first function is an automatic event tagging where parsing engine 412 tags common events that are in every log file 406, such as, for example, initial execution, array creation, or the like. In tagging these common events, parsing engine 412 creates a standard tag or message of each event so that each log file in which the common event occurs has a standardized tag or message which will be utilized in later analysis. The automated event tagging provided by parsing engine 412 reduces the tagging or messaging that needs to be performed by software debugging engineers when software product 404 is debugged. Additionally, parsing engine 412 performs time skew analysis of log file 406. Due to a lack of accuracy or consistency between the different computing systems on which software product 404 is tested, a line of text and/or each line of text may have a date or time that is not consistent with reality or is in a different time zone from other log files. Parsing engine 412 implements a time skew correction that starts from an original time stamp of the log file 406 and creates an artificial timeline based on the actual system timeline from which all log files will begin. Once parsing engine 412 has completed its analysis, parsing engine 412 stores the modified log file 416 in storage 414.

As parsing engine 412 stores each modified log file 416 in storage 414, software debugging users 418 may view a plurality of modified log files 416 simultaneously. That is, as presentation engine 420 receives a request from a particular software debugging user 418, presentation engine 420 presents one or more modified log files 416 to the software debugging user 418. As the software debugging user 418 views the presented one or more modified log files 416, the software debugging user 418 may tag a noticeable event within a particular one of the modified log files 416. In accordance with the illustrative embodiments, a noticeable event may be an error of the completion of a process, an abort, or the like. Tagged events are incredibly important in the debugging process and tagged events may be either caused by a defect that is being found or are a result of buggy behavior taking place. Thus, software debugging user 418 may tag noticeable events so that the noticeable events may be utilized as items with which to filter upon. That is, modified log files 416 may be lengthy and require significant time to look through. Thus, these tagged events serve as bookmarks to make finding these events at a later time simpler.

When a software debugging user 418 tags an event, event tagging incorporation engine 422 may change the color for the event, add a comment bubble to the event, and/or present a list of options for event tagging to the software debugging user 418. The list of common event tags are previously-utilized event tags previously used by the current software debugging user 418 or other software debugging users 418 and may provide commonality between software debugging users 418 for later filtering. In addition, these event tags may serve as points in a timeline that may be propagated out to other software debugging users 418 directly. That is, if more than one software debugging user 418 is viewing the modified log files 416 at the same time and one software debugging user 418 has requested input from other software debugging users 418, then if an event is tagged by one software debugging user 418, change propagation engine 424 may propagate the change out to the other software debugging users 418. Upon seeing the tagged event, the requesting software debugging user 418 may be presented with the tagged event and its location within the modified log file 416. Thus, multiple software debugging users 418 may work on and receive notification of tagged events to the same modified log files 416 simultaneously because of the cloud-based computing environment in which software debugging mechanism 400 operates.

As discussed previously, parsing engine 412 tags common events, which are incorporated into modified log files 416, and software debugging user 418 tags noticeable events, which event tagging incorporation engine 422 incorporates into modified log files 416. The common events and the noticeable events, either alone or in combination, may provide an indication of problems, issues, events, or the like, within the modified log files 416 that have been known to occur. That is, if a certain combination of problems, issues, events, or the like, happens within modified log files 416 associated with software product 404, the common events and the noticeable events, either alone or in combination, may identify a signature, pattern, or the like that may be identified without even glancing at the computing code of software product 404.

In order to identify these signatures, patterns, or the like, software debugging mechanism 400 provides navigation engine 426 which software debugging users 418 may use to navigate the one or more displayed modified log files 416. For example, navigation engine 426 provides software debugging users 418 navigation of modified log files 416 through free text searching, filtering, event navigating, adding or removing columns, statistics line graphs, or the like. In free text navigation, software debugging users 418 input text into navigation engine 426 to find similar text within modified log files 416. In free text navigation embodiment, navigation engine 426 provides software debugging users 418 with the ability to search for a keyword, command, error code, date, time, or the like, in order that software debugging users 418 may find what they are looking for. Since there may be numerous lines within each modified log file 416, navigating using free text searches provides a quick and easy way to find particular data as long as software debugging users 418 have an idea what they are looking for.

Utilizing the filtering embodiment of navigation, navigation engine 426 allows software debugging users 418 to narrow what lines of text of modified log files 416 are visible. Software debugging users 418 enter a word, phrase, number, or the like, and indicate whether they want to include or exclude text with the word, phrase, number, or the like. Navigation engine 426 then filters each line of text in modified log files 416 separately by applying the filter in the indicated manner. In the event navigation embodiment, navigation engine 426 provides software debugging users 418 the ability to navigate modified log files 416 using tagged events, whether common event tags or noticeable event tags. All events that have been tagged appear in a list that is presented to software debugging users 418. One or more of the tagged events may be selected by software debugging users 418 and navigation engine 426 will present the first of the selected events to software debugging users 418 in the presented modified log files 416.

In the adding or removing columns navigation embodiment, different components which produce modified log files 416 are sorted into columns side-by-side for easy comparison, i.e. viewing multiple ones of modified log files 416 at the same time. In this embodiment, navigation engine 426 provides viewing of multiple ones of modified log files 416 simultaneously in order to reduce unnecessary viewing of information individually. As should be noted, navigation engine 426 provides for the use of multiple navigation means at one time. For example, the adding or removing columns navigation embodiment may be combined with the event navigation embodiment so that, if more than one of the modified log files 416 are presented at one time, then navigation engine 426 presents the first occurrence of the selected event in each of the more than one presented modified log files 416. Event navigation provides software debugging users 418 an easy way to move from one occurrence of a selected event to a next occurrence of the selected event without having to scroll through all of modified log files 416.

In the statistics line graph navigation embodiment, utilizing an artificial timeline generated for a modified log file 416, navigation engine 426 creates a statistics line graph. The statistics line graph provides a depiction of the bandwidth utilized during the execution of the software product 404 which is reflected in a particular one of modified log files 416. When bandwidth is affected significantly, the activity appears on the statistics line graph in the form of a line moving up or down. The x-axis is used to show the passing of time and the y-axis is used to show bandwidth in megabytes per second. The statistics line graph is an important and useful correlation tool provided by navigation engine 426 because software debugging users 418 can hover a pointer over the graph and see specific time stamps where a particular bandwidth spike takes place and determine that something important (an event) occurred at this point in time. Navigation engine 426 presents the associated modified log file 416 below the statistics line graph for referencing what events are taking place when the software debugging user's 418 pointer hovers at a particular location on the statistics line graph. In an alternative embodiment, navigation engine 426 may present the portion of the associated modified log file 416 in a pop-up window indicating an event description, if any, associated with the point where the software debugging user's 418 pointer is hovering on the statistics line graph. Additionally, navigation engine 426 provides software debugging users 418 with a zoom feature such that software debugging users 418 may zoom into portions of the statistics line graph to increase the accuracy of the time stamps that are being viewed at different points on the statistics line graph.

Thus, software debugging mechanism 400 within a cloud computing environment provides efficient debugging of software code by providing software debugging users with a set of modified log files side-by-side with identified events and a plurality of navigation methods with which to view the identified events. That is, as test engineers, support engineers, development personnel, or the like, for the software code encounter issues, the log files logged during the encounter are tagged with messages identifying the issue, the log files are uploaded to the software debugging mechanism, and the software debugging mechanism compares the log files based on the messages. The software debugging mechanism parses the associated log files for the messages, organizing lines of text of the log files by timestamp, and coordinating events based on messages and timestamps. Since one software code system may comprise multiple log-producing components, which have processes running simultaneously, the software debugging mechanism provides for log file comparison from each piece of the system in individual columns, side-by-side based on messages and timestamps associated with a plurality of events.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
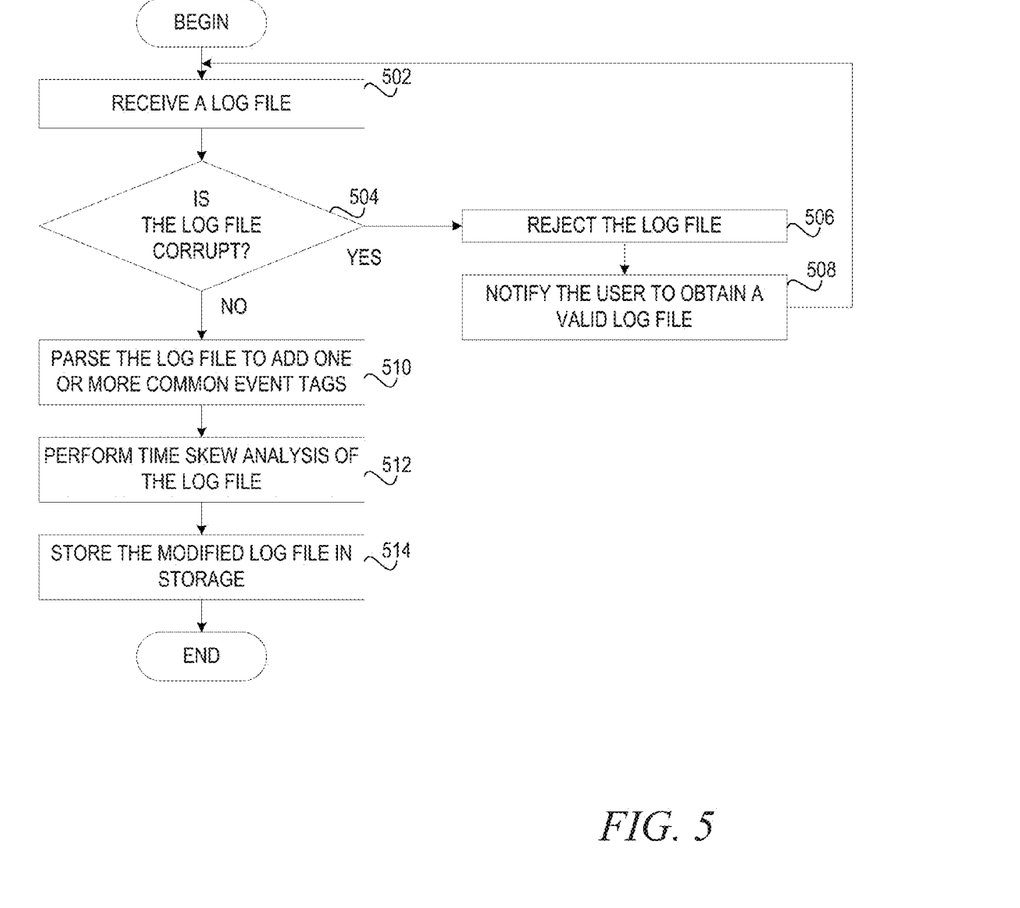
FIG. 5 depicts the operation performed by a software debugging mechanism in providing efficient debugging of software code in accordance with an illustrative embodiment.

FIG. 5 depicts the operation performed by a software debugging mechanism in uploading a log file for efficiently debugging software code in accordance with an illustrative embodiment. As the operation begins, the software debugging mechanism receives a log file from a field engineer, test engineer, support engineer, or the like, who is uploading the log file responsive to testing a software product (step 502). The software debugging mechanism processes the log file to determine whether the tog file is corrupted (step 504). If at step 504 the software debugging mechanism determines that the log file is corrupted, the software debugging mechanism rejects the log file (step 506) and notifies the user to obtain a valid log file by rerunning the software product and collecting a new log file (step 508), with the operation retuning to step 502.

If at step 504 the software debugging mechanism determines that the log file fails to have any corruption, the software debugging mechanism parses the log file to add one or more common event tags, i.e. tags for events such as initial execution, array creation, or the like (step 510). In tagging these common events, the software debugging mechanism creates a standard tag or message of each event so that each log file in which the common event occurs has a standardized tag or message which will be utilized in later analysis. The automated event tagging provided by the software debugging mechanism reduces the tagging or messaging that needs to be performed by software debugging engineers when the software product is debugged. Additionally, the software debugging mechanism performs time skew analysis of the log file (step 512). Due to a lack of accuracy or consistency between the different computing systems on which the software product is tested, a line of text and/or each line of text may have a date or time that is not consistent with reality or is in a different time zone from other log files. Thus, the software debugging mechanism implements a time skew correction that starts from an original time stamp of the log file and creates an artificial timeline based on the actual system timeline from which all log files will begin. Once the software debugging mechanism has completed its analysis, the software debugging mechanism stores the modified log file in storage (step 514), with the operation ending thereafter.

Figure 6:
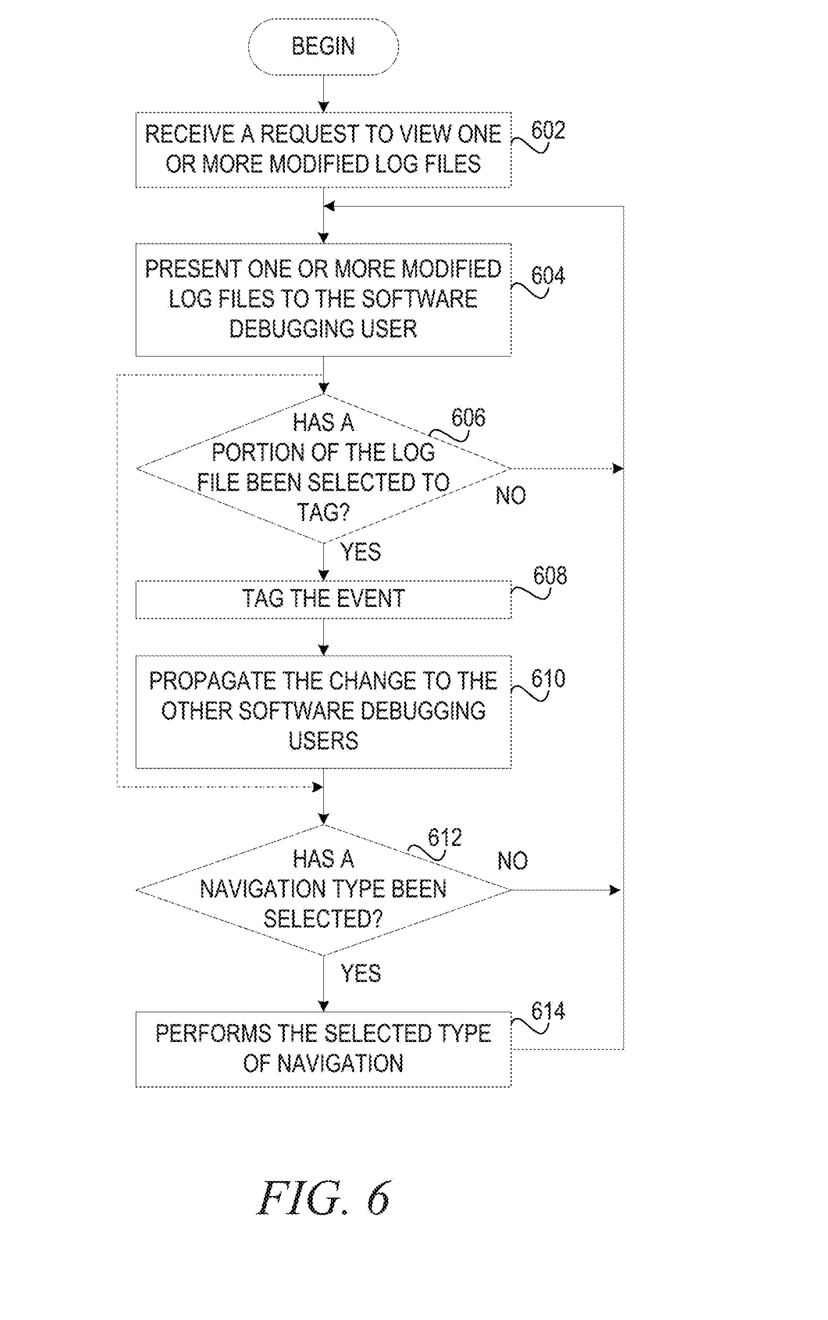
FIG. 6 depicts the operation performed by a software debugging mechanism in providing efficient debugging of software code in accordance with an illustrative embodiment.

FIG. 6 depicts the operation performed by a software debugging mechanism in providing efficient debugging of software code in accordance with an illustrative embodiment. As the operation begins, as the software debugging mechanism stores each modified log file in the storage, the software debugging mechanism receives a request from a particular software debugging user to view one or more modified log files (step 602). The software debugging mechanism presents one or more modified log files to the software debugging user (step 604). As the software debugging user views the presented one or more modified log files, the software debugging user may tag a noticeable event within a particular one of the modified log files. In accordance with the illustrative embodiments, a noticeable event may be an error of the completion of a process, an abort, or the like. Tagged events are incredibly important in the debugging process and tagged events may be either caused by a defect that is being found or are a result of buggy behavior taking place. The software debugging mechanism determines whether the software debugging user has indicated a portion of the log to tag (step 606). If at step 606 the software debugging mechanism determines the user's intent to tag an event, the software debugging mechanism tags the event (step 608) by changing the color for the event, adding a comment bubble to the event, and/or presenting a list of options for event tagging to the software debugging user. The list of common event tags are previously-utilized event tags previously used by the current software debugging user or other software debugging users and may provide commonality between software debugging users for later filtering.

In addition, these event tags may serve as points in a timeline that may be propagated out to other software debugging users directly. That is, if more than one software debugging user is viewing the modified log files at the same time and one software debugging user has requested input from other software debugging users, then, if an event is tagged by one software debugging user, the software debugging mechanism propagates the change to the other software debugging users (step 610). Upon seeing the tagged event, the requesting software debugging user may be presented with the tagged event and its location within the modified log file. Thus, multiple software debugging users may work on and receive notification of tagged events to the same modified log files simultaneously because of the cloud-based computing environment in which the software debugging mechanism operates. If at step 606 the software debugging mechanism determined the user has not provided an intent to tag an event, the operation returns to step 604.

Either after step 610 or in a parallel operation to steps 606-610 (as indicated by the dashed line), the software debugging mechanism may receive an indication to navigate the presented modified log files in one of a plurality of manners. That is, in order to identify signatures, patterns, or the like, within the set of presented modified log files, the software debugging users may select one of a plurality of different ways to find a selected portion of the modified log files or view the modified log file in a specific way. Thus, the software debugging mechanism monitors for one of a plurality of navigation selections made by a software debugging user who is viewing the presented modified log files (step 612). If at step 612 the software debugging mechanism determines that the user has selected one or a combination of navigations in which to view the modified log file(s) in a free text searching, filtering, event navigating, adding or removing columns, statistics line graphs, or the like, navigation option, the software debugging mechanism performs the selected type of navigation (step 614).

At step 614, the possibilities include but are not limited to:
- In free text navigation, the software debugging users input text into the software debugging mechanism to find similar text within the modified log files. In free text searching, the software debugging mechanism provides software debugging users with the ability to search for a keyword, command, error code, date, time, or the like, in order that the software debugging users may find what they are looking for. Since there may be numerous lines within each modified log file, navigating using free text searches provides a quick and easy way to find particular data as long as software debugging users have an idea What they are looking for.
- In filtering navigation, the software debugging mechanism allows software debugging users to narrow what lines of text of the modified log files are visible. Software debugging users enter a word, phrase, number, or the like, and indicate whether they want to include or exclude text with the word, phrase, number, or the like. The software debugging mechanism then filters each line of text in the modified log files separately by applying the filter in the indicated manner.
- In event navigation, the software debugging mechanism provides software debugging users the ability to navigate the modified log files using tagged events, whether common event tags or noticeable event tags. All events that have been tagged appear in a list that is presented to software debugging users. One or more of the tagged events may be selected by software debugging users and the software debugging mechanism presents the first of the selected events to software debugging users in the presented modified log files.
- In adding or removing columns navigation, different components which produce the modified log files are sorted into columns side-by-side for easy comparison, i.e. viewing multiple ones of the modified log files at the same time. The software debugging mechanism provides viewing of multiple ones of modified log files simultaneously in order to reduce unnecessary viewing of information individually, or
- In statistics line graph navigation, utilizing an artificial timeline generated for the modified log files, the software debugging mechanism creates a statistics line graph. The statistics line graph provides a depiction of the bandwidth utilized during the execution of the software product which is reflected in a particular one of the modified log files. When bandwidth is affected significantly, the activity appears on the statistics line graph in the form of a line moving up or down. The x-axis is used to show the passing of time and the y-axis is used to show bandwidth in megabytes per second. The statistics line graph is an important and useful correlation tool provided software debugging mechanism because software debugging users can hover a pointer over the graph and see specific time stamps where a particular bandwidth spike takes place and determine that something important (an event) occurred at this point in time. The software debugging mechanism presents the associated modified log file below the statistics line graph for referencing what events are taking place when the software debugging user's pointer hovers at a particular location on the statistics line graph. In an alternative embodiment, the software debugging mechanism may present the portion of the associated modified log file in a pop-up window indicating an event description, if any, associated with the point where the software debugging user's pointer is hovering on the statistics line graph. Additionally, the software debugging mechanism provides software debugging users with a zoom feature such that software debugging users may zoom into portions of the statistics line graph to increase the accuracy of the time stamps that are being viewed at different points on the statistics line graph.

Once the software debugging mechanism has implemented the selected navigation method or if at step 612 the software debugging mechanism determines that the user fails to have selected one or a combination of navigations in which to view the modified log file(s), the operation returns to step 604.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for efficient debugging of software code by providing software debugging users with a set of modified log files side-by-side with identified events and a plurality of navigation methods with which to view the identified events. As test engineers, support engineers, development personnel, or the like, for the software code encounter issues, the log files logged during the encounter are tagged with messages identifying the issue, the log files are uploaded to the software debugging mechanism, and the software debugging mechanism compares the log files based on the messages.

The software debugging mechanism parses the associated log files for the messages, organizing lines of text of the log files by timestamp, and coordinating events based on messages and timestamps. Since one software code system may comprise multiple log-producing components, which have processes running simultaneously, the software debugging mechanism provides for log file comparison from each piece of the system in individual columns, side-by-side based on messages and timestamps associated with a plurality of events.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for efficiently debugging software code, the method comprising:
    presenting, by a presentation engine specifically configured by a processor in the data processing system, a set of modified log files associated with the software code to a software debugging user on a display of computing device the software debugging user is utilizing, wherein the set of modified log files are modified, by a parsing engine configured by the processor in the data processing system, with tags of common events that are in every log file of a set of log files and wherein the set of modified log, files are modified, by the parsing engine, with a time skew correction that creates an artificial time line based on an actual system timeline from which all log files in the set of log file will begin;
    responsive to receiving an indication from the software debugging user to tag a portion of a modified log file of the set of modified log files with a tag, tagging, by an event tagging incorporation engine specifically configured by the processor, the portion of the modified log file, wherein the tag of the portion of the modified log file is utilized in debugging the software code; and
    propagating, by a change propagation engine specifically configured by the processor, the tag of the portion of the modified log file to a plurality of other software debugging users who are viewing the modified log file on a display of respective computing device which each of the other software debugging users are utilizing.

2. The method of claim 1, wherein presenting, by the presentation engine, the set of modified log files associated with the software code to the software debugging user comprises:
    presenting, by the presentation engine, the set of modified log files side-by-side with each other in order to identify a signature or pattern within the set of modified log files.

3. The method of claim 2, wherein presenting, by the presentation engine, the set of modified log files side-by-side is based on an artificial timeline that is based on an actual system timeline from which all the set of modified log files begin.

4. The method of claim 2, wherein presenting, by the presentation engine, the set of modified log files side-by-side is coordinated based on at least one of a text search, a filter, or an event.

5. The method of claim 2, wherein presenting, by the presentation engine, the set of modified log files side-by-side includes presenting, by the presentation engine, a statistics line graph in association with at least one of the set of modified log files and wherein the statistics line, graph illustrates a comparison of an artificial timeline versus the number of events logged during the execution of the software code.

6. The method of claim 5, wherein, responsive to the software debugging user selecting a portion of the statistics line graph, a corresponding portion of the log file is presented by the presentation engine.

7. The method of claim 1, wherein the tagging of the portion of the modified log file comprises at least one of changing a presentation color associated with the portion of the modified log file, adding a comment bubble to the portion of the modified log file, or associating an event indicator from a list of event indications with the portion of the modified log file.

8. A computer program product comprising a non-transitory computer readable storage medium having a computer readable program stored therein, wherein the computer readable program, when executed on a computing device, causes the computing device to:
    present, by a presentation engine specifically configured by the computing device, a set of modified log files associated with software code to a software debugging user on a display of computing device the software debugging user is utilizing, wherein the set of modified log files are modified, by a parsing engine configured by the computing device, with tags of common events that are in every log file of a set of log files and wherein the set of modified log files are modified, by the parsing engine, with a time skew correction that creates an artificial time line based on an actual system timeline from which all log files in the set of log file will begin;

responsive to receiving an indication from the software debugging user to tag a portion of a modified log file of the set of modified log files with a tag, tag, by an event tagging incorporation engine specifically configured by the computing device, the portion of the modified log file, wherein the tag of the portion of the modified log file is utilized in debugging the software code; and propagate, by a change propagation engine specifically configured by the computing device, the tag of the portion of the modified log file to a plurality of other software debugging users who are viewing the modified log file on a display of respective computing device which each of the other software debugging users are utilizing.

9. The computer program product of claim 8, wherein the computer readable program to present the set of, modified log files associated with the software code to the software debugging user further causes the computing device to:

present, by the presentation engine, the set of modified log files side-by-side with each other in order to identify a signature or pattern within the set of modified log files.

10. The computer program product of claim 9, wherein presenting, by the presentation engine, the set of modified log files side-by-side is based on an artificial timeline that is based on an actual system timeline from which all the set of modified log files begin.

11. The computer program product of claim 9, wherein presenting, by the presentation engine, the set of modified log files side-by-side is coordinated based on at least one of a text search, a filter, or an event.

12. The computer program product of claim 9, wherein presenting, by the presentation engine, the set of modified log files side-by-side includes presenting a statistics line graph in association with at least one of the set of modified log files and wherein the statistics line graph illustrates a comparison of an artificial timeline versus the number of events logged during the execution of the software code.

13. The computer program product of claim 12, wherein, responsive to the software debugging user selecting a portion of the statistics line graph, a corresponding portion of the log file is presented, by the presentation engine.

14. The computer program product of claim 9, wherein the tagging of the portion of the modified log file comprises at least one of changing a presentation color associated with the portion of the modified log file, adding a comment bubble to the portion of the modified log file, or associating an event indicator from a list of event indications with the portion of the modified log file.

15. An apparatus comprising:
a processor; and
a memory coupled to the processor, wherein the memory comprises instructions which, when executed by the processor, cause the processor to:
present, by a presentation engine specifically configured by the processor, a set of modified log files associated with software code to a software debugging user on a display of computing device the software debugging user is utilizing, wherein the set of modified log files are modified, by a parsing engine configured by the processor, with tags of common events that are in every log file of a set of log files and wherein the set of modified log files are modified, by the parsing engine, with a time skew correction that creates an artificial time line based on an actual system timeline from which all log files in the set of log file will begin;

responsive to receiving an indication from the software debugging user to tag a portion of a modified log file of the set of modified log files with a tag, tag, by an event tagging incorporation engine specifically configured by the processor, the portion of the modified log file, wherein the tag of the portion of the modified log file is utilized in debugging the software code; and propagate, by a change propagation engine specifically configured by the processor, the tag of the portion of the modified log file to a plurality of other software debugging users who are viewing the modified log file on a display of respective computing device which each of the other software debugging users are utilizing.

16. The apparatus of claim 15, wherein the instructions to present the set of modified log files associated with the software code to the software debugging, user further causes the processor to:

present, by the presentation engine, the set of modified log files side-by-side with each other in order to identify a signature or pattern within the set of modified log files.

17. The apparatus of claim 16, wherein presenting, by the presentation engine, the set of modified log files side-by-side is based on an artificial timeline that is based on an actual system timeline from which all the set of modified log files begin.

18. The apparatus of claim 16, wherein presenting, by the presentation engine, the set of modified log files side-by-side is coordinated based on at least one of a text search, a filter, or an event.

19. The apparatus of claim 16, wherein presenting, by the presentation engine, the set of modified log files side-by-side includes presenting a statistics line graph in association with at least one of the set of modified log files, wherein the statistics line graph illustrates a comparison of an artificial timeline versus the number of events logged during the execution, of the software code, and wherein, responsive to the software debugging user selecting a portion of the statistics line graph, a corresponding portion of the log file is presented, by the presentation engine.

20. The apparatus of claim 15, wherein the tagging of the portion of the modified log file comprises at least one of changing a presentation color associated with the portion of the modified log file, adding a comment bubble to the portion of the modified log file, or associating an event indicator from a list of event indications with the portion of the modified log file.

* * * * *